United States Patent
Chhabra et al.

(10) Patent No.: US 12,147,320 B2
(45) Date of Patent: Nov. 19, 2024

(54) SYSTEMS AND METHODS OF TIERED DATA STORAGE AND PROCESSING AND DECISION MAKING

(71) Applicant: Micron Technology, Inc., Boise, ID (US)

(72) Inventors: Bhumika Chhabra, Boise, ID (US); Erica A. Ellingson, Boise, ID (US); Sumedha Gandharava, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 76 days.

(21) Appl. No.: 17/936,948

(22) Filed: Sep. 30, 2022

(65) Prior Publication Data

US 2024/0111651 A1 Apr. 4, 2024

(51) Int. Cl.
*G06F 11/00* (2006.01)
*G06F 11/30* (2006.01)
*G06F 11/32* (2006.01)

(52) U.S. Cl.
CPC ...... *G06F 11/3089* (2013.01); *G06F 11/3075* (2013.01); *G06F 11/327* (2013.01)

(58) Field of Classification Search
CPC ............ G06F 11/3089; G06F 11/3075; G06F 11/327; G06F 11/0709; G06F 11/079; G06F 11/0787; G06F 11/0793; G06F 11/3072
See application file for complete search history.

(56) References Cited

U.S. PATENT DOCUMENTS

| | | | |
|---|---|---|---|
| 9,996,388 B1 | 6/2018 | Khafizova | |
| 10,521,379 B1 | 12/2019 | Callison et al. | |
| 11,069,222 B2 | 7/2021 | Poder et al. | |
| 11,194,626 B2 | 12/2021 | Fiske et al. | |
| 2017/0147429 A1* | 5/2017 | Motwani | G06F 11/1012 |
| 2020/0250902 A1* | 8/2020 | Golov | B60R 21/0136 |
| 2020/0411089 A1* | 12/2020 | Chawla | G11C 13/0069 |
| 2022/0050743 A1* | 2/2022 | Shen | G06F 11/3476 |

* cited by examiner

*Primary Examiner* — Joseph D Manoskey
(74) *Attorney, Agent, or Firm* — Dorsey & Whitney LLP (57) ABSTRACT

Systems, methods, and apparatuses for data prioritization and selective data processing are described herein. A computing device may receive sensor data and prioritize a first portion of the sensor data over a second portion of the sensor data. The first portion of sensor data may be stored in a first memory that has a higher access rate than a second memory where the second portion of sensor data is stored. The first portion of sensor data may be processed with priority and the second portion of sensor data may be transmitted to a cloud computing device.

23 Claims, 7 Drawing Sheets

SYSTEMS AND METHODS OF TIERED DATA STORAGE AND PROCESSING AND DECISION MAKING

BACKGROUND

As technology advances and becomes lower cost, new sensors are developed and are deployed with increasing frequency. For example, the number of sensors in vehicles has increased over the past several years. In addition to traditional speed and temperature sensors to ensure the vehicle is operating properly, there are now sensors for detecting obstacles near the vehicle, which individual is operating the vehicle, and even whether an operator is distracted. In some situations, the sensors may cause the vehicle to take action based on data collected by the sensors. For example, based on the individual detected, the driver seat may be adjusted to the individual's preferences. In another example, if an obstacle is detected, a visual and/or audible alarm may be activated. In a further example, the brakes may be engaged when an obstacle is detected.

Use of sensors and actions taken based on data collected by the sensors is not limited to vehicles. For example, glucose monitors may be integrated to insulin pumps to control release of insulin. In a further example, sensors have been developed to be included in or attached to existing mobile devices such as accelerometers and breathalyzers. As the number and types of sensors continues to increase, the amount of data and data processing may also increase.

BRIEF SUMMARY

Examples described herein relate to communication and intervention systems. Examples of data sorting and selective data processing regarding same are described herein.

A vehicle implemented with sensors may collect a variety of data. For example, a vehicle implemented with sensors may collect data about the driver and traffic data. In an example, some data may be locally evaluated with a higher priority than others based on the nature of the data and/or user preferences. The data with lower priority may be transmitted from the vehicle to a cloud-computing device that may receive data from additional vehicles. The cloud-computing device may process the data and provide a result to the vehicles. The result may be a recommendation or an intervention process. In some examples, the cloud-computing device may transmit the result and/or the data to a data center.

DETAILED DESCRIPTION

The following description of certain embodiments is merely exemplary in nature and is in no way intended to limit the scope of the disclosure or its applications or uses. In the following detailed description of embodiments of the present apparatuses, systems and methods, reference is made to the accompanying drawings which form a part hereof, and which are shown by way of illustration specific embodiments in which the described apparatuses, systems and methods may be practiced. These embodiments are described in sufficient detail to enable those skilled in the art to practice presently disclosed apparatus, systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

As the number and type of sensors increases, the type of data available and available action that can be taken based on the data may also increase. As more devices become connected, the data from sensors from individual devices may be useful to other devices. Further, as more data is collected over time, the data may reveal longer term trends that could aid in taking actions not only for individual devices but also systems of devices. However, as more data and actions become available, more data storage and processing capacity may be required.

According to embodiments of the present disclosure, data from one or more sensors may be sorted and/or prioritized by a computing device in communication with the sensors. Some of the data may be processed by the computing device (e.g., in a car, mobile device, medical device, etc.). Other data may be stored and/or transmitted to another computing device (e.g., a cloud computing device) for processing by the other computing device. The computing device may perform an action or "intervention" based on processing the data. In some examples, data processed by the computing device may be used for "short term" decisions (e.g., trigger a fire alarm). In contrast, in some examples, the data sent to the other computing device may be used to make "medium term" decisions and/or decisions based on data received from multiple devices (e.g., adjust a delivery route). Further, in some examples, the other computing device may provide at least some of the received data to another computing device (e.g., data center). This computing device may store data from multiple computing devices over time, which may be used to make "long term" decisions in some examples (e.g., adjust staffing schedules).

By differentiating and prioritizing data between different computing devices, in some applications, less computing and/or storage capabilities may be necessary in certain devices. This may be beneficial when size or cost constraints are present in parts of a system. For example, a consumer mobile device may have more size, power, and cost limitations than a cloud computing system that receives data from multiple mobile devices.

Figure 1:
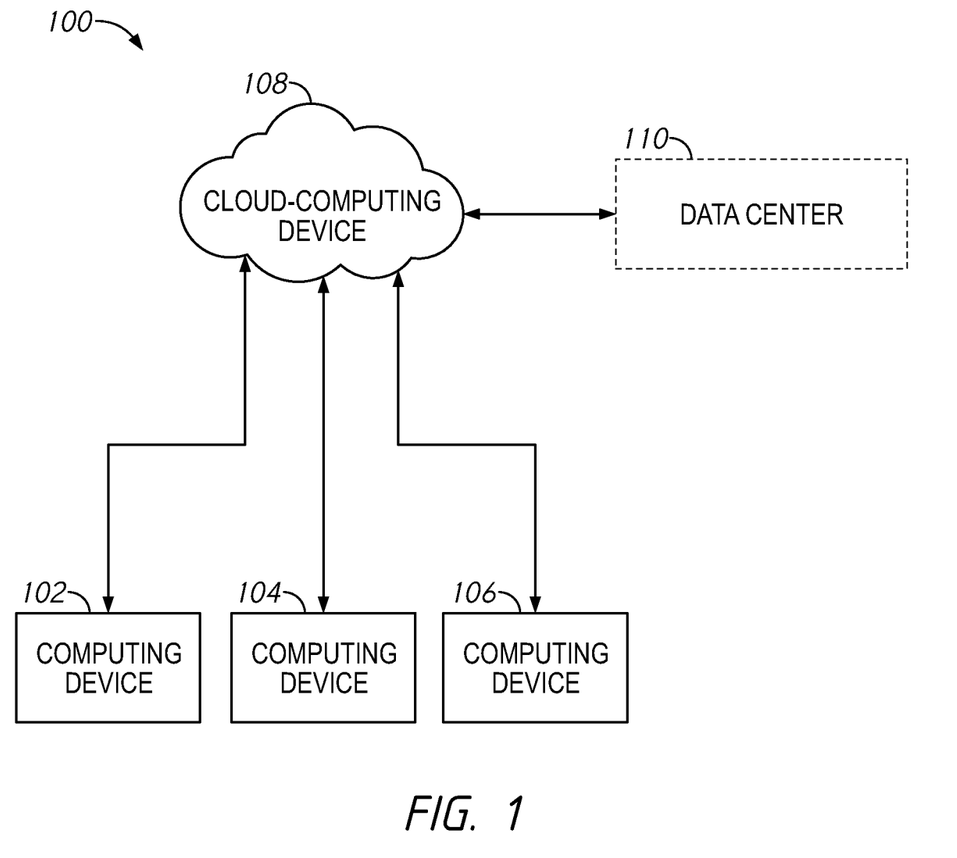
FIG. 1 is a schematic illustration of a system arranged in accordance with examples described herein.

FIG. 1 is a schematic illustration of a system arranged in accordance with examples described herein. The system 100 includes multiple computing devices (e.g., computing device 102, computing device 104, and computing device 106), a cloud-computing device 108, and a data center 110.

While three computing devices are shown in FIG. 1, more or fewer computing devices may be in use. In some examples, the computing devices 102, 104, and 106 may be coupled to the cloud-computing device 108. Optionally, the cloud-computing device 108 may be coupled to the data center 110.

The computing device 102 may include multiple sensors. The computing device 102 may receive data from the sensors. In some examples, the computing device 102 may prioritize a first portion of the data over a second portion of the data based on attributes associated with individual sensors. For example, the attributes associated with sensors that evaluate whether the driver is fit to operate a vehicle may be prioritized over sensors that detect the road conditions. In some examples, prioritization of the data may be based on analysis of the data by a machine learning algorithm. The first portion of the data may be stored in a first memory and the second portion of the data may be stored in a second memory. In some examples, the first memory may have a higher access rate than the second memory. Therefore, the first portion of the data may be processed at a higher rate than the second portion of the data. The second portion of the data may be transmitted to the cloud-computing device 108. In other examples, the computing device 102 may make a short term decision based on the sensor data and stop the operation of the computing device 102. In other examples, the computing device 102 may make a short term decision to trigger an alarm based on the sensor data.

The cloud-computing device 108 may receive data from one or more of the computing devices 102, 104, and 106. In some examples, the cloud-computing device 108 may receive the second portion of the data of the computing device. The cloud-computing device 108 may sort the received data into a first portion of the data and a second portion of the data and store the portions in the respective first memory and second memory based on data types of the data. For example, data related to traffic conditions of nearby roads may be processed as the first portion of the data and data related to the GPS locations of the computing devices 102, 104, and/or 106 may be processed as the second portion of the data. The first portion of data may be analyzed at a faster rate than the second portion of data. The cloud-computing device 108 may generate a result based on the data received from the one or more of the computing devices 102, 104, and 106 and a directive based on the result. The directive may be transmitted to the one or more of the computing devices 102, 104, and 106. In some examples, the directive may include an intervention process. An example of the intervention process may be prohibiting the computing devices to operate for at least a period of time. In some examples, the directive may be a medium term decision made by the cloud-computing device 108. In other examples, the medium term decision may include stopping and changing the operation of at least one of the computing devices 102, 104, and 106. In other examples, the medium term decision may include triggering an alarm in at least one of the computing devices 102, 104, and 106.

In some examples, the cloud-computing device 108 may provide some or all of the data provided by one or more of computing devices 102, 104, and 106 to data center 110. The cloud-computing device 108 may correlate the data received from individual ones of the one or more computing devices 102, 104, and 106 and generate an assessment of the correlation of data. In some examples, the correlation and assessment may be transmitted to the data center 110. The cloud-computing device 108 may receive an instruction from the data center 110 to transmit a message to one or more of the computing device 102, 104, and 106 based on the data and/or assessment.

In some examples, the cloud-computing device 108 may include a machine learning algorithm. The cloud-computing device 108 may receive supplementary data, including weather and local laws that is significant to the machine learning algorithm. The machine learning algorithm may be used to make correlations and assessments of the data about the computing devices and the supplementary data. In some examples, the machine learning algorithm is guided by rules and/or goals defined by the data center 110.

The data center 110 may receive data from the cloud-computing device 108. In some examples, the data center 110 may analyze the data with a query, a goal, and/or multiple parameters. In some examples, the data center 110 may generate a long term decision based on the data and a directive about one or more of the computing devices 102, 104, and 106.

The data center 110 may define the rules and/or goals around the data received from the cloud-computing device 108. The rules and/or goals may be used to guide the machine learning algorithm implemented by the cloud-computing device 108. Examples of the rules and/or goals include sending data, notifications, and/or directives on one or more of the computing devices 102, 104, and 106. In some examples, the long term decision may include changing a schedule of the operation of one or more of the computing devices 102, 104, and 106. In some examples, the long term decision may be a suggestion as a result of data analysis. In other examples, the long term decision may be reflected in the rules and/or goals used to guide the machine learning algorithm implemented by the cloud-computing device 108. In some examples, the data center 110 may analyze the received data with one or more machine learning algorithms to generate the rules, goals, and/or long term decisions.

In some examples, the data center 110 may include a memory and a processor (not shown). The memory may utilize Compute Express Link (CXL) storage to utilize memory available resources for large data quantities. The processor may interact with the assessments reported by the cloud-computing device 108 and send any changes to rules and goals used to guide the machine learning algorithm implemented by the cloud-computing device 108.

Figure 2A:
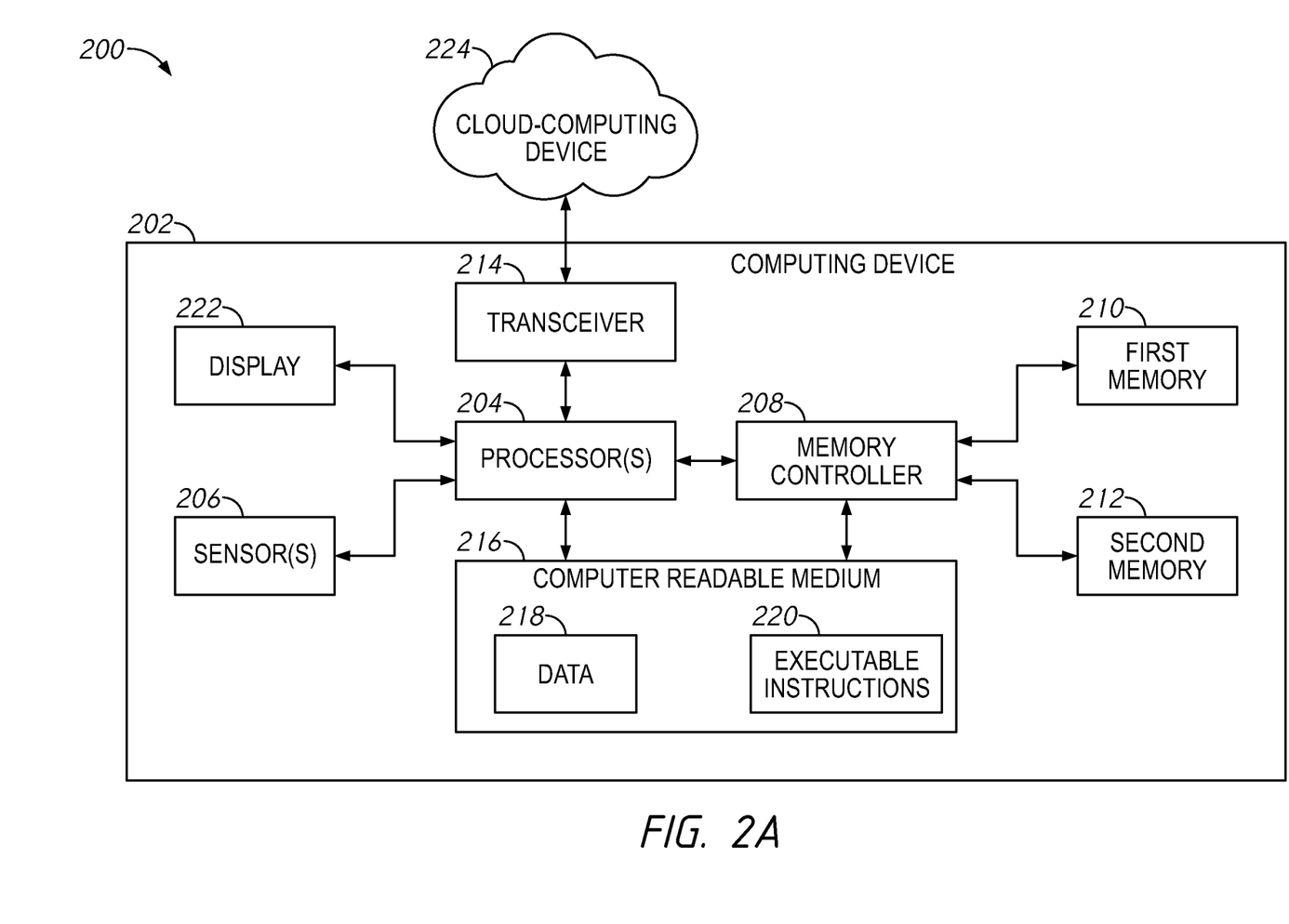
FIG. 2A is a schematic illustration of an example system arranged in accordance with examples described herein.

FIG. 2A is a schematic illustration of a computing system 200 arranged in accordance with examples of the present disclosure. The computing system 200 may include a computing device 202 and a cloud-computing device 224. In some examples, the computing device 202 may include one or more processor(s) 204, one or more sensor(s) 206, a computer readable medium 216, a memory controller 208, a first memory 210, a second memory 212, a transceiver 214, and/or display 222. The computer readable medium 216 may include data 218 and executable instructions 220. The computing system 200 may be used to implement the computing device 102, computing device 104, and/or computing device 106 of FIG. 1 in some examples. The cloud-computing device 224 may be used to implement the cloud-computing device 108 as shown in FIG. 1 in some examples.

In some examples, the computing device 202 may be included in a mobile device, such as a smart phone, cell phone, gaming device, or tablet. In some examples, the computing device 202 may be implemented wholly or partially using a computer, a server, television, or a laptop. In other examples, the computing device 202 may be coupled to or included in a vehicle or a medical device.

In some examples, the computing device 202 may include one or more sensor(s) 206. The sensor(s) 206 may be integrated with the computing device 202 and placed on, in, around, above, below, and/or proximate to the computing device 202. The sensor(s) 206 may include geolocation sensors, accelerometers, thermistors, chemical sensors, motion sensors, blood pressure monitor, and/or any other sensor currently known or known in the future.

In some other examples, the processor(s) 204 may be implemented using one or more central processing units (CPUs), graphical processing units (GPUs), application specific integrated circuits (ASICs), field programmable gate arrays (FPGAs), and/or other processor circuitry. In some examples, the processor(s) 204 may be in communication with a first memory 210 and a second memory 212 via a memory controller 208. In some examples, the first memory 210 and the second memory 212 may be volatile memory, such as dynamic random access memory (DRAM). The first memory 210 may have a higher data collection rate than the second memory 212. For example, the first memory 210 may be implemented by 1α DRAM™ memory.

The first memory 210 and the second memory 212 may provide information to and/or receive information from the processor(s) 204 and/or computer readable medium 216 via the memory controller 208 in some examples. While a single first memory 210, a single second memory 212, and a single memory controller 208 are shown, any number may be used. In some examples, the memory controller 208 may be integrated with the processor(s) 204.

The computing device 202 may include a computer readable medium 216. The computer readable medium 216 may be implemented using any suitable medium, including non-transitory computer readable media. Examples include memory, random access memory (RAM), read only memory (ROM), volatile or non-volatile memory, hard drive, solid state drives, or other storage. The computer readable medium 216 may be accessible to the processor(s) 204 and/or the memory controller 208. The computer readable medium 216 may be encoded with executable instructions 220. The executable instructions 220 may be executed by the processor(s) 204. For example, the executable instructions 220 may cause the processor(s) 204 to analyze the sensor data from the sensor(s) 206. In some examples, the executable instructions 220 may cause the processor(s) 204 to sort a first portion of the sensor data to the first memory 210 and a second portion of the sensor data to the second memory 212 based on attributes associated with individual sensors of the sensor(s) 206. For example, the executable instructions 220 may include instructions that cause sensor data associated with sensors that evaluate whether a patient has a normal heart beat may be prioritized over sensors that detect the patient has a normal temperature. In an example in which the executable instructions 220 are to identify whether the electrocardiogram (ECG) sensors (e.g., electrodes) indicate the patient has a normal heart rate, the executable instructions 220 may cause the processor(s) 204 to sort sensor data associated with these sensors to the first memory 210 that has a higher access rate than the second memory 212. Sensor data generated by other sensors of the sensor(s) 206 may be sorted to the second memory 212. The sensor data stored in the second memory 212 may be packaged and transmitted to the cloud-computing device 224 at regular intervals via the transceiver 214.

In some examples, a machine learning algorithm and/or other algorithm (e.g., rules-based) may be used to prioritize the data. The algorithm may be implemented by the executable instructions 220 when executed by the processor(s) 204. In some examples, the algorithm may be trained to determine which sensor data to prioritize. For example, in the patient monitoring case, both heart rate and blood pressure may be important factors, but a machine learning algorithm may be trained to determined which sensor currently has priority (e.g., detects change in rate of blood pressure is greater than change in rate of heart rate).

In some examples, the executable instructions 220 may cause the processor(s) 204 to analyze the sensor data stored in the first memory 210 to generate a result based on the analysis. The result may determine whether the processor(s) 204 initiates an intervention process. For example, if the result indicates that the patient has an irregular/slow/rapid heart rate, the processor(s) 204 may initiate an intervention process in which an audible or visual alarm on a bedside monitor and/or nurse's station is triggered.

The computer readable medium 216 may store data 218. In some examples, the data 218 may include a database of an acceptable range of data for each of the sensor(s) 206 and/or the attributes associated with the data type of each of the sensor(s) 206. Continuing the medical monitoring example, normal heart rate ranges, normal blood pressure ranges, normal blood oxygen ranges, and/or the like may be stored. While a single medium is shown in FIG. 2A, multiple media may be used to implement computer readable medium 216.

The computing device 202 may be in communication with the display 222. The display 222 may be a separate component (e.g., using a wired and/or wireless connection) or the display 222 may be integrated with the computing device 202. In some examples, the display 222 may display the result and/or any notification as described above as part of the intervention process. Any number or variety of displays may be present, including one or more LED, LCD, plasma, or other display devices.

The computing device 202 may be equipped with one or more transceivers (e.g., transceivers 214 of FIG. 2A). The transceiver 214 may include one or more receivers, transmitters, or combinations thereof. Transceivers described herein may be used to transmit and/or receive data from a cloud-computing device 224. For example, the transceiver 214 may be used to transmit data stored in the second memory 212 to the cloud-computing device 224 at regular intervals. The transceiver 214 may be used to transmit data stored in the first memory 210 to the cloud-computing device 224 at intervals different than those of the second memory 212. The transceiver 214 may be used to receive data, notifications, directives, or combinations thereof from the cloud-computing device 224. In some examples, the communication of data, notifications, and directives are based on the rules and regulations defined by the data center (e.g., data center 110 of FIG. 1).

The cloud-computing device 224 may be implemented by the cloud-computing device 108 of FIG. 1. The cloud-computing device 224 may receive data packages from the computing device 202 and other computing devices (e.g., any of computing device 102, computing device 104, and computing device 106 of FIG. 1). In some examples, the cloud-computing device 224 may be coupled to a data analysis center or a nursing station and data may be received from individual patient monitors.

Figure 2B:
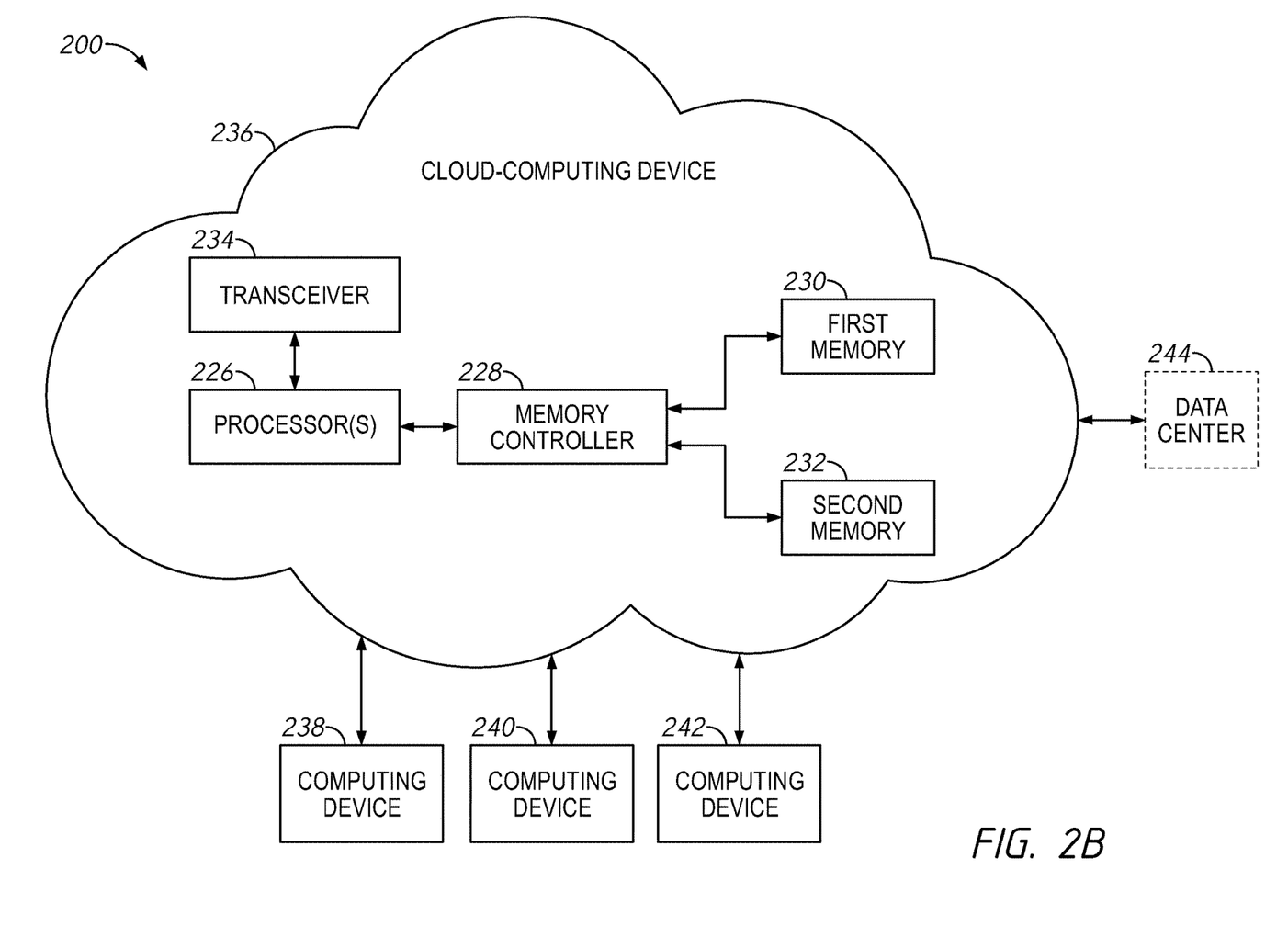
FIG. 2B is a schematic illustration of an example system arranged in accordance with examples described herein.

FIG. 2B is a schematic illustration of an example computing system 200 arranged in accordance with examples described herein. The computing system 200 may include a computing device 238, a computing device 240, a computing device 242, a cloud-computing device 236, and optionally a data center 244.

In some examples, the computing device 238, the computing device 240, and the computing device 242 may be implemented by the computing device 102, the computing device 104, and the computing device 106 of FIG. 1, and/or the computing device 202 of FIG. 2A. Each of the computing devices 238, 240, and 242 may be coupled to the cloud-computing device 236. Any number of computing devices may be coupled to the cloud-computing device 236.

The cloud-computing device 236 may be implemented by the cloud-computing device 108 of FIG. 1 and/or the cloud-computing device 224 of FIG. 2A in some examples. The cloud-computing device 236 may include a processor(s) 226, a memory controller 228, a first memory 230, a second memory 232, and a transceiver 234.

The cloud-computing device 236 may be equipped with one or more transceiver 234. The transceiver 234 may include one or more receivers, transmitters, or combinations thereof. Transceivers described herein may be used to transmit and/or receive data from a variety of sources, including any computing systems and/or computing devices. For example, the transceiver 234 may receive data packages from at least one of the computing devices 238, 240, and 242, and/or other computing devices (not shown). The transceiver 234 may be used to transmit data stored in a first memory 230 and/or a second memory 232 to the data center 244. The transceiver 234 may be used to receive data, notifications, directives, or combinations thereof from the data center 244 and transmit same to at least one of the computing devices 238, 240, and 242 based on the rules defined by the data center 244.

The cloud-computing device 236 may include one or more processor(s) 226. The processor(s) 226 may summarize sensor data received from one or more of the computing devices 238, 240, and 242. The cloud-computing device 224 may receive supplementary data (e.g., weather, local laws, clinical practices, etc.). In some examples, the supplementary data may be received from sources other than the computing devices 238, 240, 242 (e.g., databases, other cloud computing devices, data center 244, etc.). In some examples, the supplementary data may be used as inputs, in addition data received from the computing devices 238, 240, and 242, to a machine learning algorithm implemented by the processor(s) 226. In some examples, the processor(s) 226 of the cloud-computing device 224 may generate reports, assessments, and correlations of the received data with the supplementary data based on the machine learning algorithm. In some examples, the machine learning algorithm may be guided by rules and goals defined by the data center 244. However, in other examples, the machine learning algorithm may be trained and provide outputs based on the supplementary data and computing devices.

The processor(s) 226 may be in communication with a first memory 230 and a second memory 232 via a memory controller 228. In some examples, the first memory 230 and the second memory 232 may be volatile memory, such as dynamic random access memory (DRAM). The first memory 230 may have a higher data collection rate than the second memory 232. For example, the first memory 230 may be implemented by 1α DRAM™ memory. In some examples, the memory controller 228 may implement CXL technology to utilize the first and second memories 230, 232. The cloud-computing device 224 may utilize the same logic that the processor(s) 204 of the computing device 202 utilizes the sort data (e.g., supplementary data and received data, directives from the data center 244). While a single first memory 230, a single second memory 232, and a single memory controller 228 are shown, any number may be used.

In some examples, the memory controller 228 may be integrated with the processor(s) 226.

In some examples, the data center 244 may be implemented by the data center 110 of FIG. 1. The data center 244 may receive data from the cloud-computing device 236. For example, the data center 244 may receive the reports, assessments, and/or correlations generated by the cloud-computing device 236. In some examples, the data center 244 may receive some or all of the data received by cloud-computing device 236 from the computing devices 238, 240, and 242. In some examples, the data center 244 may generate a decision based on the data and generate a directive about one or more of the computing devices 238, 240, and 242. The data center 244 may communicate directives to the one or more of the computing devices 238, 240, and 242 via the cloud-computing device 236. The data center 244 may define the rules and/or goals around the data received from the cloud-computing device 236. In some examples, the rules and/or goals may be used to guide the learning algorithm implemented by the cloud-computing device 236.

Figure 3:
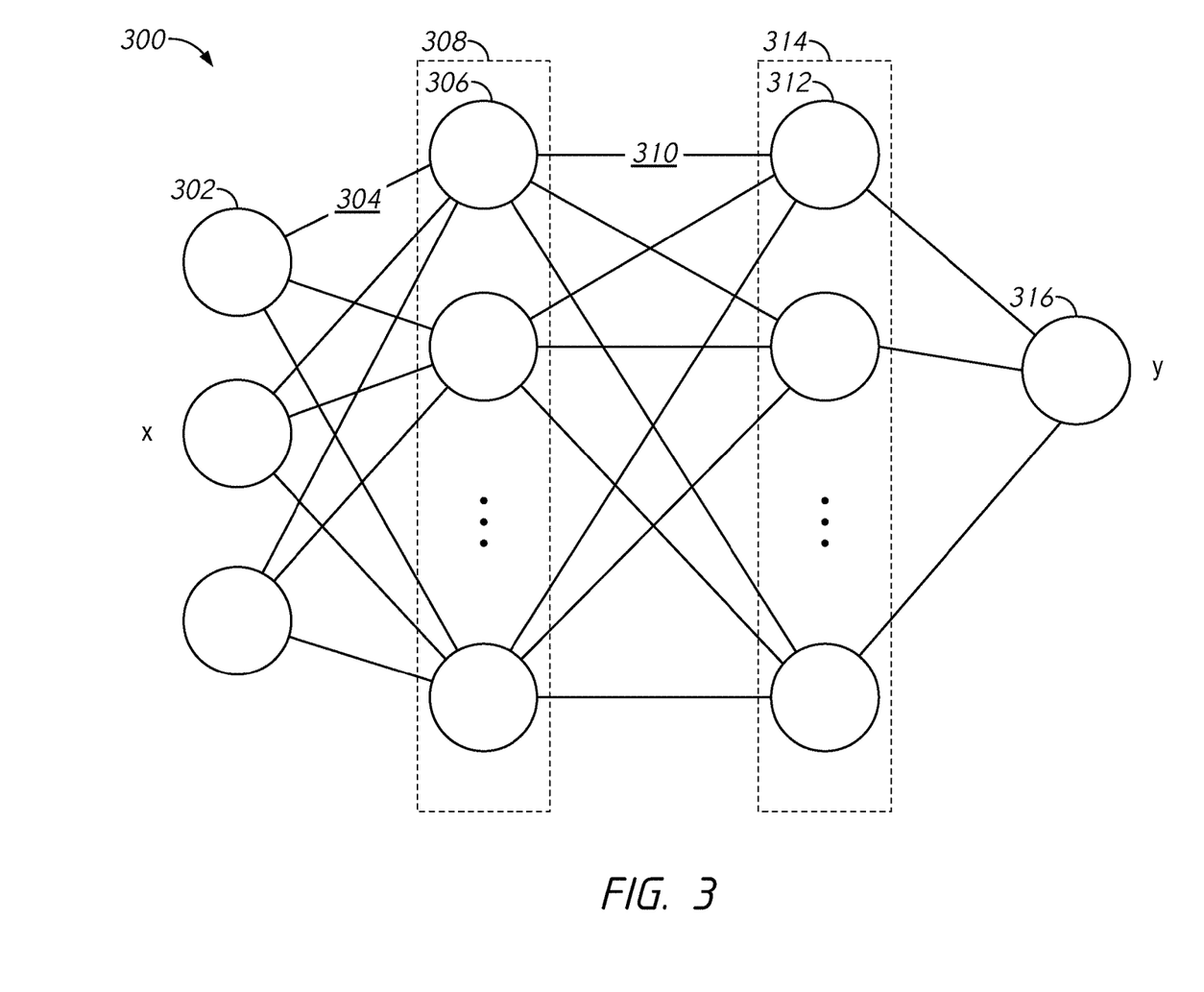
FIG. 3 is an example of a machine learning model in accordance with examples of the present disclosure.

FIG. 3 is an example of a machine learning model in accordance with examples of the present disclosure. In the example shown in FIG. 3, the machine learning model includes a neural network 300. In some examples, the neural network may be used to implement the machine learning algorithm(s) implemented by computing device 102, computing device 104, computing device 106, computing device 202, computing device 238, computing device 240, computing device 242, cloud-computing device 108, cloud-computing device 224, cloud-computing device 236, data center 110 and/or data center 244. In some examples, neural network 300 may be a convolutional network with three dimensional layers. The neural network 300 may include input nodes 302. In some examples, the input nodes 302 may be organized in a layer of the neural network 300. The input nodes 302 may be coupled to one or more layers 308 of hidden units 306 by weights 304. In some examples, the hidden units 306 may perform operations on one or more inputs x from the input nodes 302 based, at least in part, with the associated weights 304. In some examples, the hidden units 306 may be coupled to one or more layers 314 of hidden units 312 by weights 310. The hidden units 312 may perform operations on one or more outputs from the hidden units 306 based, at least in part, on the weights 310. The outputs of the hidden units 312 may be provided to an output node 316 to provide a result y.

In some examples, the input x may include one or more values for one or more sensor data from sensor(s) 206 of FIG. 2A and/or supplementary data such as weather and local laws. In some examples, the result y may include one or more results and/or assessments. In an example, the results and/or assessments may indicate that a patient has an irregular/slow/rapid heart rate and/or an initiation of an intervention process based on the biological data of the patient. The intervention process may include triggering an alarm. In another example, the results and/or assessments may indicate whether the driver is under the influence of alcohol and/or an initiation of an intervention process based on the determination that the driver is under the influence. The intervention process may include triggering an alarm, turning off music in the vehicle, follow up testing of the driver, stopping the vehicle at a safe location, etc. In some examples, the result may be included in a dataset associated with the sensor data and/or assessments calculated from the sensor data.

In some examples, the neural network 300 may be trained by providing one or more training data sets. The neural network 300 may be trained by the computing device used to make inferences with the neural network in some examples (e.g., by computing device 102, computing device 104, computing device 106, computing device 202, computing device 238, computing device 240, computing device 242, cloud-computing device 108, cloud-computing device 224, cloud-computing device 236, data center 110 and/or data center 244). In some examples, the neural network 300 may be trained by another computing device to determine weights and/or node arrangements or other neural network configuration information, and the weights and/or other neural network configuration information provided to the computing device used to make inferences.

In some examples, the neural network 300 may be trained using supervised learning techniques. In some examples, training data may include a set of inputs x, each associated (e.g., tagged) with a desired result y. Each input x may include one or more values for one or more surface characteristics. For example, one input x may include a value of blood alcohol concentration associated with a result y that is a diagnosis of driver intoxication. Based on the training data set, the neural network 300 may adjust one or more weights 304, 310, number of hidden units 306, 312 and/or number of layers 308, 314 of the neural network 300. The trained neural network 300 may then be used to make inferences on inputs x (that are not associated with desired results) to generate results y.

In some examples, the neural network 300 may be dynamically trained. That is, the neural network 300 may continue to adjust the one or more weights 304, 310, number of hidden units 306, 312 and/or number of layers 308, 314 based on new data. For example, a user intervention may cause the neural network 300 to adjust. Furthermore, in some examples, the machine learning model may be trained using semi-supervised and/or unsupervised techniques. In these examples, data sets may not include a desired result associated with every input.

The machine learning model shown in FIG. 3 is provided merely as an example and the present disclosure is not limited to the neural network 300. For example, the machine learning algorithm may include multiple neural networks 300 and/or other machine learning models (e.g., support vector machine). In some examples, the machine learning algorithm may include different machine learning models for different applications.

Figure 4:
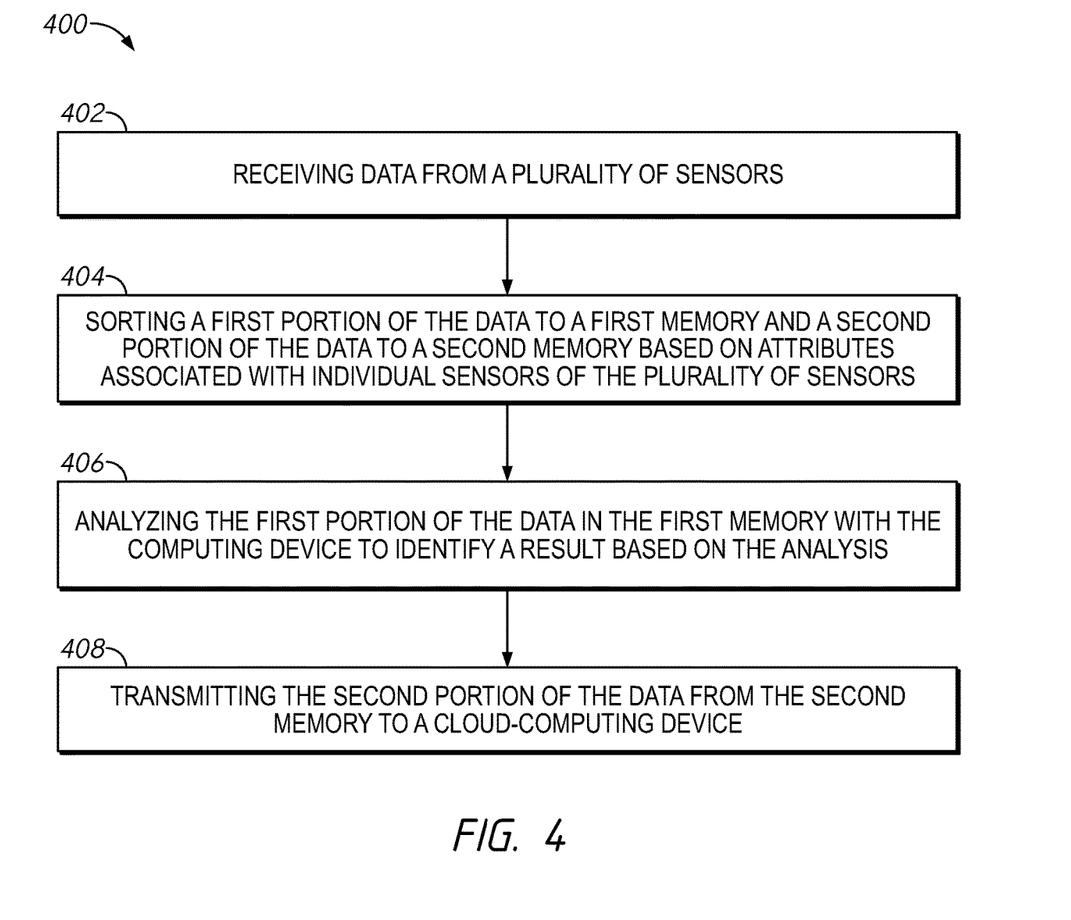
FIG. 4 is a flowchart of a method in accordance with examples of the present disclosure.

FIG. 4 is a flowchart of a method 400 in accordance with examples of the present disclosure. Method 400 includes block 402, block 404, block 406, and block 408. In block 402, data may be received from a plurality of sensors (e.g., sensor(s) 206 of FIG. 2A) of the computing device. In block 404, which may follow block 402, a processor may sort the data to a respective memory. In block 406, which may follow block 404, the processor may analyze the first portion of data that is stored in a first memory and identify a result based on the analysis. In block 408, the transceiver 214 may transmit the second portion of data that is stored in the second memory to a cloud-computing device (e.g., cloud-computing device 108, cloud-computing device 224, and/or cloud-computing device 236). Additional, fewer, and/or otherwise ordered blocks may be used in other examples. The method 400 may be performed by the computing devices 102, 104, 106 of FIG. 1. The method 400 may additionally or alternatively be performed by the computing devices 202, 238, 240, 242 of FIG. 2A and FIG. 2B.

In block 402, the sensor(s) 206 of the computing device 202 may generate sensor data and the processor(s) 204 may receive the sensor data. The sensor(s) 206 of the computing device 202 may generate sensor data that is sorted in the block 404 by the processor(s) 204 of FIG. 2A.

In block 404, the processor(s) 204 of the computing device 202 may sort a first portion of the data to a first memory 210 and a second portion of the data to a second memory 212 based on attributes associated with individual sensors of the sensor(s) 206. In some examples, the first memory 210 may have a faster access rate than the second memory 212. For example, the first portion of the data may be deemed as being factors that directly indicate whether the driver is under the influence. The first portion of the data may be analyzed in block 406 by the processor(s) 204 of FIG. 2A. The second portion of the data may be transmitted in block 408 by the transceiver 214 of FIG. 2A.

In block 406, the processor(s) 204 may analyze the first portion of the data in the first memory to identify a result based on the analysis. The analysis of the sensor data may be a comparison with a logic table stored in the first memory 210. The result may indicate whether an intervention process is to be initiated. An example of the intervention process may be prohibiting the computing devices to operate for at least a period of time.

In block 408, the transceiver 214 may transmit the second portion of data may be transmitted from the second memory 212 to a cloud-computing device 224. The cloud-computing device 224 may receive data from one or more computing devices and analyze the collective data. The transceiver 214 may transmit data stored in the second memory 212 to the cloud-computing device 224 at regular intervals. In some examples, the transceiver 214 may additionally or alternatively transmit data stored in the first memory 210 to the cloud-computing device 224 at intervals different than those of the second memory 212. The transceiver 214 may be used to receive data, notifications, directives, or combinations thereof from the cloud-computing device 224.

Figure 5:
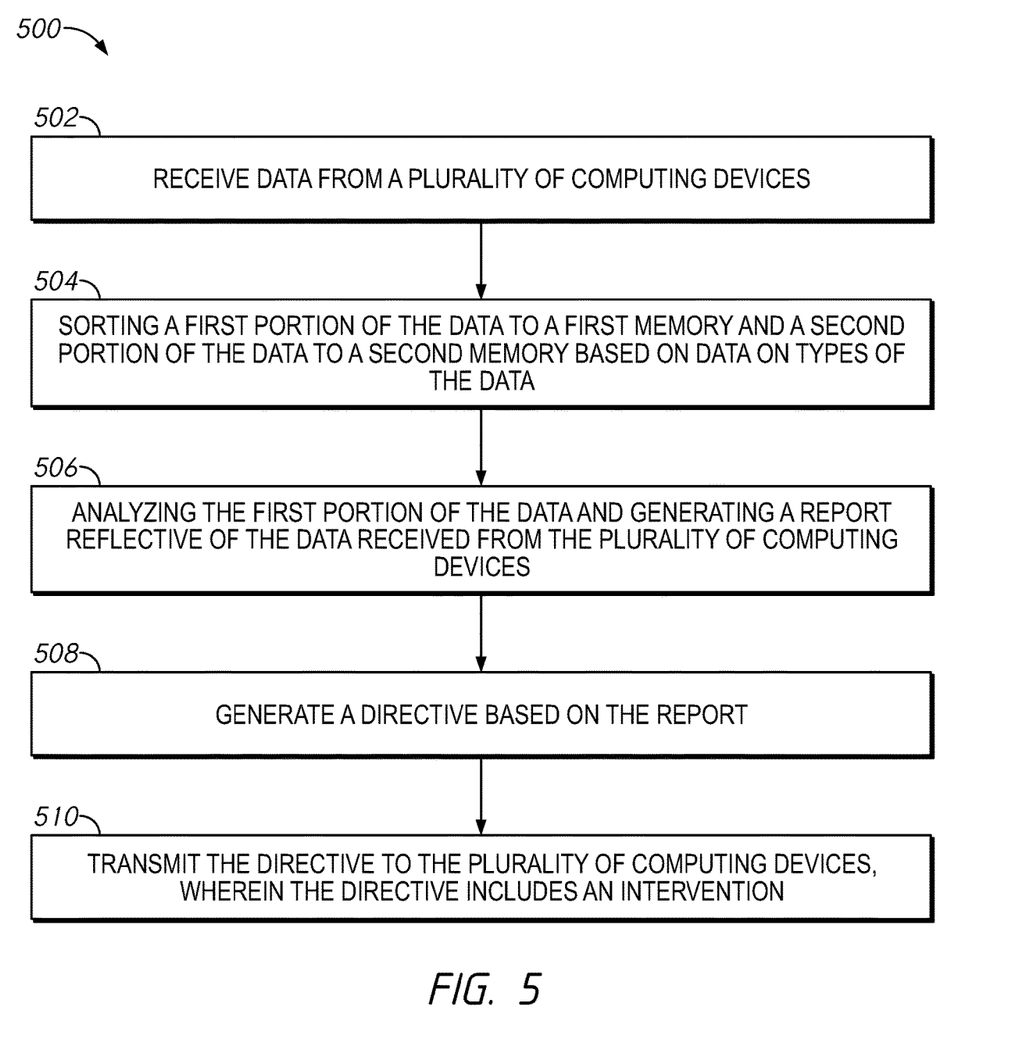
FIG. 5 is a flowchart of a method in accordance with examples of the present disclosure.

FIG. 5 is a flowchart of a method 500 in accordance with examples of the present disclosure. Method 500 includes block 502, block 504, block 506, block 508, and block 510. In block 502, data may be received from a plurality of computing devices (e.g., computing devices 102, 104, 106 of FIG. 1, computing device 202 of FIG. 2A and/or computing devices 238, 240, 242 of FIG. 2B) of the computing device. In block 504, which may follow block 502, a processor may sort the data to a respective memory. In block 506, which may follow block 504, the processor may analyze the first portion of data that is stored in a first memory and generate a report. In block 508, which may follow block 506, the processor may generate a directive based on the report. In block 510, which may follow block 508, the transceiver 234 may the directive to at least one of the plurality of computing devices. Additional, fewer, and/or otherwise ordered blocks may be used in other examples. The method 500 may be performed by the computing devices 102, 104, 106 of FIG. 1. The method 500 may additionally or alternatively be performed by the cloud-computing device 224 of FIG. 2A and the cloud-computing device 236 of FIG. 2B.

In block 502, the transceiver 234 of the cloud-computing device 236 of FIG. 2B may receive sensor data a plurality of computing devices (e.g., computing devices 102, 104, 106 of FIG. 1, computing device 202 of FIG. 2A and/or computing devices 238, 240, 242 of FIG. 2B). The processor(s) 226 of the cloud-computing device 236 may sort the data to its respective memory of FIG. 2B in block 504.

In block 504, the processor(s) 226 may sort a first portion of the data to a first memory 230 and a second portion of the data to a second memory 232 based on data types of the data. The first memory 230 has a faster access rate than the second memory 232. For example, data related to traffic conditions of nearby roads may be processed as the first portion of the data and data related to the GPS locations of the computing devices 102, 104, 106 and/or computing devices 238, 240, 242 may be processed as the second portion of the data. In another example, data the alertness of the driver may be processed as the first portion of the data; and data related to the road condition and supplementary data (e.g., weather and local laws) may be processed as the second portion of the data. The first portion of the data may be analyzed by the processor(s) 226 at block 506.

In block 506, the processor(s) 226 may analyze the first portion of the data and generate a report based on the first portion of the data received from the plurality of computing devices. The report may include assessments, and correlations of the received data with the supplementary data based on the machine learning algorithm. The machine learning algorithm may be guided by rules and goals defined by the data center 244. Based on the report, the processor(s) 226 may generate a directive at block 508.

In block 508, the processor(s) 226 may generate a directive based on the report, according to the machine learning algorithm defined by the data center 244 of FIG. 2B. The directive may be instructions for at least one of the computing devices. The directive may be based on the rules and regulations defined by the data center (e.g., data center 110 of FIG. 1 and/or data center 244 of FIG. 2B). The transceiver 234 may transmit the directive to the at least one of the computing devices at block 510.

In block 510, the transceiver 234 may transmit the directive generated by the processor(s) 226 to one or more of the plurality of computing devices. In some examples, the instructions may be an intervention process. An example of the intervention process may be prohibiting the computing devices to operate for at least a period of time.

Figure 6:
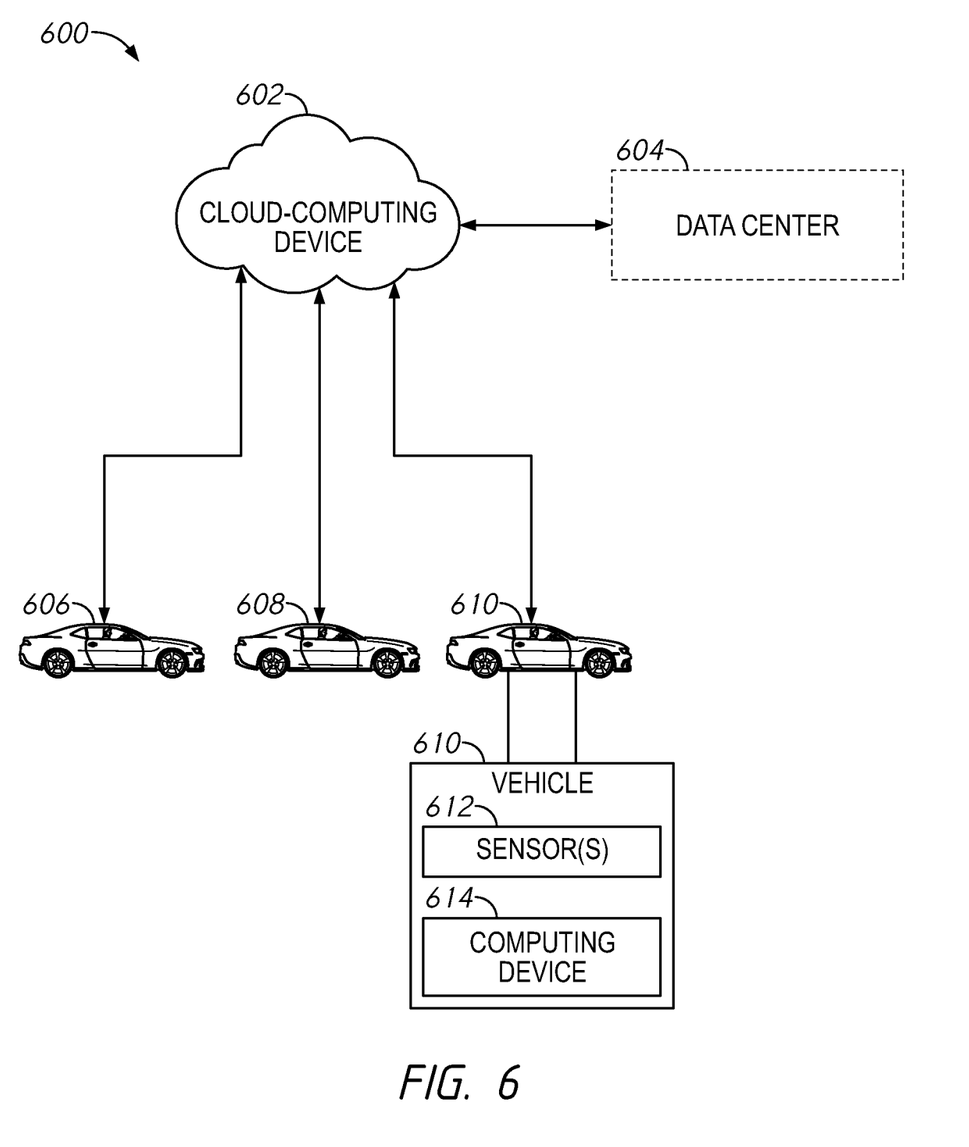
FIG. 6 is a schematic illustration of a system arranged in accordance with examples described herein.

FIG. 6 is a schematic illustration of a system arranged in accordance with examples described herein. The system 600 may be implemented by the system 100 of FIG. 1. The system 600 includes multiple vehicles (e.g., vehicle 606, vehicle 608, and vehicle 610), a cloud-computing device 602, and a data center 604. While three vehicles are shown in FIG. 6, more or fewer vehicles may be in use. In some examples, the vehicles 606, 608, and 610 may be coupled to the cloud-computing device 602. Optionally, the cloud-computing device 602 may be coupled to the data center 604. The vehicle 610 may include sensor(s) 612 and a computing device 614. Although only vehicle 610 is shown in FIG. 6 to include sensor(s) 612 and computing device 614, the other vehicles in the system 600 (e.g. vehicle 606 and vehicle 608) may also include sensor(s) and a computing device.

In an example, each of the vehicles 606, 608, and 610 includes sensor(s) 612. The sensor(s) 612 may be implemented by the sensor(s) 206 of FIG. 2A. Each sensor may be associated with one or more attributes. For example, the sensors may include breathalyzers, cameras, microphones, fingerprinting based alcohol content detectors, sweat based alcohol content detectors, heart rate detectors, fingerprint detectors, face and eye trackers, optical sensors (e.g., cameras, infrared sensors), temperature sensors, accelerometers, gyroscopes, inertial sensors, humidity sensors, RADAR sensors (e.g., LiDARs), ultrasonic sensors, rain sensors, lane departure sensors, vehicle parameter sensors (e.g., sensors used to sense a position and/or state of one or more vehicle components, such as but not limited to, a wheel position sensor, a wheel speed sensor, an airspeed sensor), altimeter, or combinations thereof. In some examples, the sensor data generated by each of the sensor(s) 612 may be categorized into two tiers based on the attributes associated with the individual sensors.

Each of the vehicles 606, 608, and 610 may include a computing device 614. The computing device 614 may be implemented by any one of the computing devices 102, 104, 106 of FIG. 1, computing device 202 of FIG. 2A, and computing devices 238, 240, 242. The computing device 614 may be communicatively coupled to the cloud-computing device 602. The computing device 614 may sort the sensor data collected by the sensor(s) 612 into a number of tiers (e.g. 2) for processing. For example, the computing device 614 may prioritize a first portion of the data over a second portion of the data. In an example where the short term decision to be made by the computing device 614 relates to whether the driver of vehicle 610 is driving under the influence, the first portion of data that may include sensor data associated with the user such as breathalyzers, cameras, microphones, fingerprinting based alcohol content detectors, sweat based alcohol content detectors, heart rate detectors, fingerprint detectors, face and eye trackers, etc.; the second portion of data may include sensor data associated with the environment such as optical sensors (e.g., cameras, infrared sensors), temperature sensors, accelerometers, gyroscopes, inertial sensors, humidity sensors, RADAR sensors (e.g., LiDARs), ultrasonic sensors, rain sensors, lane departure sensors, vehicle parameter sensors (e.g., sensors used to sense a position and/or state of one or more vehicle components, such as but not limited to, a wheel position sensor, a wheel speed sensor, an airspeed sensor), altimeter, or combinations thereof. The first portion of data may be stored in a first memory and the second portion of the data may be stored in a second memory. In some examples, the first memory may have a higher access rate than the second memory. Therefore, the first portion of the data may be processed at a higher rate than the second portion of the data.

The computing device 614 may process the first portion of data utilizing a logic table determine whether the driver is under the influence. An example logic table is provided in Table-1 below. If the computing device 614 determines that the driver is under the influence, the computing device 614 may inhibit ignition of vehicle 610. In another example, if the result indicates that the driver is under the influence, the computing device 614 may prompt the driver to take a second test ensure the driver is fit to operate the vehicle. An example logic table is provided in Table-1. Alternatively or additionally, the computing device 614 may cause the vehicle 610 to ring an alarm if the driver is under the influence as described with respect to FIG. 2A. The first internal alarm may include an audible alarm and a notification on a display (e.g., display 222 of FIG. 2A), music and/or any non-emergency call turned off, a limit on maximum driving speed to match that of the posted speed limit, or combinations thereof. After a predetermined period of time has passed (e.g., 1 minute, 2 minutes, 5 minutes, 10 minutes, etc.), if the driver still fails the test, a second internal alarm may be triggered in which the audible alarm and notification may be repeated, the music and/or non-emergency calls may remain turned off, and the limit of maximum driving speed in maintained. In addition to the second internal alarm, an external alarm may be triggered, in which audible alarm sounds are audible outside the vehicle and caution flashers are turned on, a notification with GPS location of the vehicle is sent to the authority and/or parties identified in a network previously determined (e.g., family and company).

computing device 602. The first portion and the second portion may be transmitted together or separately. The cloud-computing device 602 may be implemented by cloud-

TABLE 1

| Breath Sensor | Sweat Sensor | Final Result | Fingerprint Sensor | Car Action |
|---|---|---|---|---|
| Fail | Fail | Fail | *If fingerprint matches one of the list of allowed drivers then ignition will be allowed unless the individual has been designated a "not allowed driver." | Inhibit ignition |
| Fail | Pass | Fail | | Inhibit ignition |
| Pass | Fail | Fail | | Inhibit ignition |
| Pass | Pass | Pass | | Allow ignition, *unless driver is "not allowed" |
| No reading or invalid reading for either sensor input. | | Re-input of sample(s) requested | *If fingerprint does not match one of the list of allowed drivers then car may inhibit ignition if that custom action has been pre-setup. | Re-input of sample(s) requested |

In another example, the computing device 614 may determine whether the driver is fit to operate the vehicle 610 while the vehicle 610 is in motion. For example, the computing device may include processor(s) that continuously sample the driver. In this example, attributes associated with a breathalyzer, eye and face tracker, lane departure sensor, and speed limit may be sorted as the first portion of data such that it is processed at a higher rate than the second portion of the data. Sensor data generated by other sensors may be sorted as the second portion of data.

Optionally, the computing device 614 may further initiate autopilot to take over car control and guide the vehicle 610 to stop at a safe location. In some examples, the analysis of the sensor data may utilize a logic table. An example logic table is provided below as Table-2.

computing device 108 of FIG. 1, cloud-computing device 224 of FIG. 2A, and/or cloud-computing device 236 of FIG. 2B.

The cloud-computing device 602 may receive data packages from at least one of the vehicles 606, 608, 610, and/or other vehicles (not shown). The cloud-computing device 602 may be coupled to the data center 604 that establishes rules for the machine learning algorithm implemented by cloud-computing device 602. The cloud-computing device 602 may receive supplementary data (e.g., weather, local laws, or combinations thereof) from the data center 604. The cloud-computing device 602 may generate a report, an assessment and/or correlation about the data packages received from the vehicles with the supplementary data based on the machine learning algorithm.

TABLE 2

Reaction Cascade Based on Test Results and Driver Compliance:

| Breath Sensor | Eye/face Tracker | Lane Sensor | Speed Limit | Final Result | 1st Internal Alarm | 2nd Internal Alarm (~5 min delay from 1st alarm) | External Alarm (~5 min delay from 1st alarm) | Car intervention (~5 min delay from 1st alarm) |
|---|---|---|---|---|---|---|---|---|
| Fail | Fail | Fail | Fail | Fail | Audible alarm to driver and notification on navigation screen. Music/radio/non-emergency calls are turned off to reduce distractions. Car limits max driving speed to that of the posted speed limit (using GPS to know speed limit). | Repeat audible alarm to driver and notification to navigation screen. Music/radio/non-emergency calls are turned off to reduce distractions. Car continues to limit max driving speed to the posted speed limit. | Audible alarm sounds to other drivers/outside the car. Caution flashers turn on. Notification w/GPS location of car to family/company/police. Car continues to limit max driving speed to the posted speed limit. | Newer cars with autopilot abilities will initiate the autopilot to take over car control and guide the car to stop, pull to the side, or otherwise exist the road where safe. Older cars--n/a |
| Fail | Fail | Pass | Fail | Fail | | | | |
| Fail | Pass | Fail | Fail | Fail | | | | |
| Pass | Fail | Fail | Fail | Fail | | | | |
| Fail | Pass | Pass | Fail | Fail | | | | |
| Pass | Fail | Pass | Fail | Fail | | | | |
| Pass | Pass | Fail (greater than 3 violations within 5 min) | Fail | Fail | | | | |
| Pass | Pass | Fail (lower than 3 violations within 5 min) | Fail | Pass | None | None | None | None |
| Pass | Pass | Pass | Fail | Pass | None | None | None | None |
| Pass | Pass | No reading available (dirt road) | Pass | Pass | None | None | None | None |

The second portion of the data may be transmitted to the cloud-computing device 602. In Some examples, the first portion of data may also be transmitted to the cloud- In some examples, the cloud-computing device 602 may sort the data received from the vehicles 606, 608, 610 into a first portion and a second portion and store the portions in the respective first memory and second memory based on data types of the data. The first memory may have a faster access rate than the second memory thus the first portion of data may be analyzed at a faster rate than the second portion of data. The cloud-computing device 602 may generate a medium term decision based on the sensor data received from the vehicles 606, 608, 610. Examples of the medium term decision include an intervention (e.g. Stopping or changing the operation) to at least one of the vehicles 606, 608, 610. An example of the intervention process may be prohibiting the computing devices to operate for at least a period of time as shown in Table-2.

In some examples, the medium term decision may include recommendations for re-route. For example, the vehicle 610 may encounter a traffic jam and transmit data to the cloud-computing device 602. The cloud-computing device 602 may analyze data related to the traffic jam and determine that the route the vehicle 610 is on should be avoided. In this example, data related to traffic conditions of nearby roads may be processed as the first portion of the data and data related to the GPS locations of the vehicles 606, 608, 610 may be processed as the second portion of the data. The first portion of data may be analyzed at a faster rate than the second portion of data. The cloud-computing device 602 may generate a result based on the data received from the one or more of the vehicles 606, 608, 610 and a directive based on the result. The result may be a recommendation of an alternative route to other vehicles (e.g., vehicle 606 and 608) to avoid the traffic jam. In some examples, the result may be generated based on the supplementary data received from the data center 604. For example, if the supplementary data indicates inclement weather, the recommendation of an alternative route may avoid dangerous areas.

The cloud-computing device 602 may be communicatively coupled to the data center 604. The data center may be implemented by data center 110 of FIG. 1 and/or data center 244 of FIG. 2B. The data center 604 may receive the first portion of data and second portion of data from the cloud-computing device 602 and generate a long term decision based on the sensor data sent by the cloud-computing device 602. An example of a long term decision include changing a deployment schedule involving the vehicles 606, 608, 610. For example, if the data received from the cloud-computing device 602 indicates a pattern of consistent traffic jams on route A at 3 pm based on the data collected by the vehicles 606, 608, 610. The data center 604 may suggest for the vehicles 606, 608, 610 to utilize an alternative route and/or depart at a different time. The suggestion may be sent to the cloud-computing device 602 and update the learning algorithm.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Specific elements of any foregoing embodiments can be combined or substituted for elements in other embodiments. Moreover, the inclusion of specific elements in at least some of these embodiments may be optional, wherein further embodiments may include one or more embodiments that specifically exclude one or more of these specific elements. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

What is claimed is:

1. A method comprising:
   for each of a plurality of computing devices:
   receiving data from a plurality of sensors;
   sorting a first portion of the data to a first memory and a second portion of the data to a second memory based on attributes associated with individual sensors of the plurality of sensors, wherein the first memory has a faster access rate than the second memory, wherein the first portion of the data is associated with a first sensor having a first priority and the second portion of the data is associated with a second sensor having a second priority, and wherein the first priority is higher than the second priority;
   analyzing the first portion of the data in the first memory with the computing device to identify a result based on the analysis; and
   transmitting the second portion of the data from the second memory to a cloud-computing device,
   wherein the cloud-computing device is the same for the plurality of computing devices.

2. The method of claim 1, further comprising initiating, with the computing device, an intervention process based on the result.

3. The method of claim 1, wherein at least one sensor of the plurality of sensors has a higher data collection rate than another one of the plurality of sensors.

4. The method of claim 1, wherein the second portion of the data is transmitted from the second memory to the cloud computing device at a predetermined interval.

5. The method of claim 1, wherein
   the sorting of the first portion of the data and the second portion of the data is performed by a machine learning algorithm implemented by the computing device.

6. The method of claim 5, wherein the machine learning algorithm comprises a neural network.

7. The method of claim 1, wherein the analyzing of the first portion of the data in the first memory with the computing device is performed by a machine learning algorithm implemented by the computing device.

8. The method of claim 1, further comprising:
receiving feedback from the cloud-computing device; and
initiating an intervention process based on the feedback.

9. The method of claim 1, wherein the result is determined based on at least one logic table stored in the first memory.

10. The method of claim 1, further comprising:
transmitting the first portion of the data to the cloud-computing device after the first portion of the data is analyzed.

11. The method of claim 1, wherein the second portion of the data is analyzed by the cloud-computing device.

12. A method comprising:
receiving data from a plurality of computing devices, wherein each computing device of the plurality of computing devices comprises a plurality of sensors;
sorting a first portion of the data to a first memory and a second portion of the data to a second memory based on data types of the data, wherein the first memory has a faster access rate than the second memory;
analyzing the first portion of the data and generating a result reflective of the data received from the plurality of computing devices;
generating a directive based on the result; and
transmitting the directive to the plurality of computing devices, wherein the directive includes an intervention, wherein the intervention comprises stopping or changing an operation of at least one of the plurality of computing devices.

13. The method of claim 12, further comprising:
transmitting the result to a data center; and
receiving an instruction from the data center, wherein the directive is additionally generated based on the instruction.

14. The method of claim 12, further comprising analyzing the second portion of the data following the analysis of the first portion of the data.

15. The method of claim 12, wherein analyzing the first portion of the data comprises parallel data processing.

16. The method of claim 12, further comprising:
receiving supplementary data, wherein the supplementary data comprises at least one of weather and local road laws; and
integrating the supplementary data in the directive transmitted to at least one of the plurality of computing devices.

17. The method of claim 12, wherein the intervention comprises alarming an operator of at least one of the computing devices.

18. An apparatus comprising:
a plurality of memories comprising a first memory and a second memory, wherein the first memory has a faster access rate than the second memory;
a processor configured to:
receive data from a plurality of sensors;
sort a first portion of the data to the first memory and a second portion of the data to the second memory based on attributes associated with individual sensors of the plurality of sensors, wherein the first portion of the data is associated with a first sensor having a first priority and the second portion of the data is associated with a second sensor having a second priority, and wherein the first priority is higher than the second priority;
analyze the first portion of the data in the first memory to identify a result based on the analysis; and
package the second portion of the data in the second memory for data transmission;
a transmitter coupled to the processor, the transmitter configured to transmit the second portion of the data from the second memory to a cloud-computing device.

19. The apparatus of claim 18, wherein the processor is further configured to initiate an intervention process based on the result.

20. The apparatus of claim 18, wherein the transmitter is further configured to receive an instruction from the cloud-computing device, and wherein the processor is further configured to initiate an intervention process based on the instruction.

21. The apparatus of claim 18, wherein the transmitter is further configured to transmit first portion of the data to the cloud-computing device after the first portion of data is analyzed.

22. The apparatus of claim 18, further comprising the plurality of sensors.

23. The apparatus of claim 22, wherein at least one sensor of the plurality of sensors has a higher data collection rate than another sensor of the plurality of sensors.

* * * * *